US008959173B1

(12) United States Patent
Robidoux et al.

(10) Patent No.: US 8,959,173 B1
(45) Date of Patent: Feb. 17, 2015

(54) NON-DISRUPTIVE LOAD-BALANCING OF VIRTUAL MACHINES BETWEEN DATA CENTERS

(75) Inventors: Gregory S. Robidoux, Westboro, MA (US); Balakrishnan Ganeshan, Santa Clara, CA (US); Yaron Dar, Sudbury, MA (US); Kenneth J. Taylor, Franklin, MA (US); Txomin Barturen, Issaquah, WA (US); Bradford B. Glade, Harvard, MA (US)

(73) Assignee: EMC Corporation, Hopkinton, MA (US)

( * ) Notice: Subject to any disclaimer, the term of this patent is extended or adjusted under 35 U.S.C. 154(b) by 832 days.

(21) Appl. No.: 12/895,174

(22) Filed: Sep. 30, 2010

(51) Int. Cl.
G06F 15/16 (2006.01)
G06F 15/167 (2006.01)
G06F 15/177 (2006.01)
G06F 15/173 (2006.01)

(52) U.S. Cl.
USPC ........... 709/216; 709/201; 709/202; 709/213; 709/214; 709/215; 709/220; 709/221; 709/223; 709/224

(58) Field of Classification Search
USPC ................. 709/213–216, 201–202, 223–224, 709/220–221
See application file for complete search history.

(56) References Cited

U.S. PATENT DOCUMENTS 5,774,660 A * 6/1998 Brendel et al. ................. 709/201
5,781,908 A * 7/1998 Williams et al. .............. 709/223
7,577,959 B2 * 8/2009 Nguyen et al. ................ 718/105
8,117,314 B2 * 2/2012 Croft et al. .................... 709/227
2002/0069369 A1 * 6/2002 Tremain ........................ 713/201
2004/0172458 A1 * 9/2004 Pitts .............................. 709/213
2007/0180449 A1 * 8/2007 Croft et al. ........................ 718/1
2008/0201455 A1 * 8/2008 Husain .......................... 709/220
2009/0055507 A1 * 2/2009 Oeda ............................. 709/216
2009/0327471 A1 * 12/2009 Astete et al. .................. 709/223

OTHER PUBLICATIONS

LaHousse et al. ("Geographically Dispersed Parallel Sysplex", The IBM e-Business Availability Solution, v2.8 Mar. 2003.*
LaHousse et al. ("Geographically Dispersed Parallel Sysplex", The IBM e-Business Availability Solution, v2.8 Mar. 2003).*

* cited by examiner

Primary Examiner — Edward Kim
(74) Attorney, Agent, or Firm — Krishnendu Gupta; Joseph D'Angelo

(57) ABSTRACT

A method, system and program product for enabling migration of Virtual Machines with concurrent access to data across two geographically disperse sites to enable load balancing across the two geographically disperse sites, by presenting over a network a read writable logical volume at a first site, presenting over a network a read writable logical volume at a second geographically disparate site; wherein the first volume and the second volume are configured to contain the same information, and enabling read write access to the volume at the first site or the volume at the second site for a first virtual machine while keeping the data consistent between the two sites to enable transparent migration of the virtual machine to load balancing across the two sites according to at least one load balancing metric.

22 Claims, 13 Drawing Sheets

NON-DISRUPTIVE LOAD-BALANCING OF VIRTUAL MACHINES BETWEEN DATA CENTERS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application related to data storage.

BACKGROUND

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein. In a common implementation, a Storage Area Network (SAN) is used to connect computing devices with a large number of storage devices. Management and modeling programs may be used to manage these complex computing environments.

Two components having connectivity to one another, such as a host and a data storage system, may communicate using a communication connection. In one arrangement, the data storage system and the host may reside at the same physical site or location. Techniques exist for providing a remote mirror or copy of a device of the local data storage system so that a copy of data from one or more devices of the local data storage system may be stored on a second remote data storage system. Such remote copies of data may be desired so that, in the event of a disaster or other event causing the local data storage system to be unavailable, operations may continue using the remote mirror or copy.

In another arrangement, the host may communicate with a virtualized storage pool of one or more data storage systems. In this arrangement, the host may issue a command, for example, to write to a device of the virtualized storage pool. In some existing systems, processing may be performed by a front end component of a first data storage system of the pool to further forward or direct the command to another data storage system of the pool. Such processing may be performed when the receiving first data storage system does not include the device to which the command is directed. The first data storage system may direct the command to another data storage system of the pool which includes the device. The front end component may be a host adapter of the first receiving data storage system which receives commands from the host. In such arrangements, the front end component of the first data storage system may become a bottleneck in that the front end component processes commands directed to devices of the first data storage system and, additionally, performs processing for forwarding commands to other data storage systems of the pool as just described.

Often cloud computer may be performed with a data storage system. As it is generally known, "cloud computing" typically refers to the use of remotely hosted resources to provide services to customers over one or more networks such as the Internet. Resources made available to customers are typically virtualized and dynamically scalable. Cloud computing services may include any specific type of application. Some cloud computing services are, for example, provided to customers through client software such as a Web browser. The software and data used to support cloud computing services are located on remote servers owned by a cloud computing service provider. Customers consuming services offered through a cloud computing platform need not own the physical infrastructure hosting the actual service, and may accordingly avoid capital expenditure on hardware systems by paying only for the service resources they use, and/or a subscription fee. From a service provider's standpoint, the sharing of computing resources across multiple customers (aka "tenants") improves resource utilization. Use of the cloud computing service model has been growing due to the increasing availability of high bandwidth communication, making it possible to obtain response times from remotely hosted cloud-based services similar to those of services that are locally hosted.

Cloud computing infrastructures often use virtual machines to provide services to customers. A virtual machine is a completely software-based implementation of a computer system that executes programs like an actual computer system. One or more virtual machines may be used to provide a service to a given customer, with additional virtual machines being dynamically instantiated and/or allocated as customers are added and/or existing customer requirements change. Each virtual machine may represent all the components of a complete system to the program code running on it, including virtualized representations of processors, memory, networking, storage and/or BIOS (Basic Input/Output System). Virtual machines can accordingly run unmodified application processes and/or operating systems. Program code running on a given virtual machine executes using only virtual resources and abstractions dedicated to that virtual machine. As a result of such "encapsulation", a program running in one virtual machine is completely isolated from programs running on other virtual machines, even though the other virtual machines may be running on the same underlying hardware. In the context of cloud computing, customer-specific virtual machines can therefore be employed to provide secure and reliable separation of code and data used to deliver services to different customers.

BRIEF DESCRIPTION OF THE DRAWINGS

Features and advantages of the present invention will become more apparent from the following detailed description of exemplary embodiments thereof taken in conjunction with the accompanying drawings in which.

SUMMARY

Figure 1:
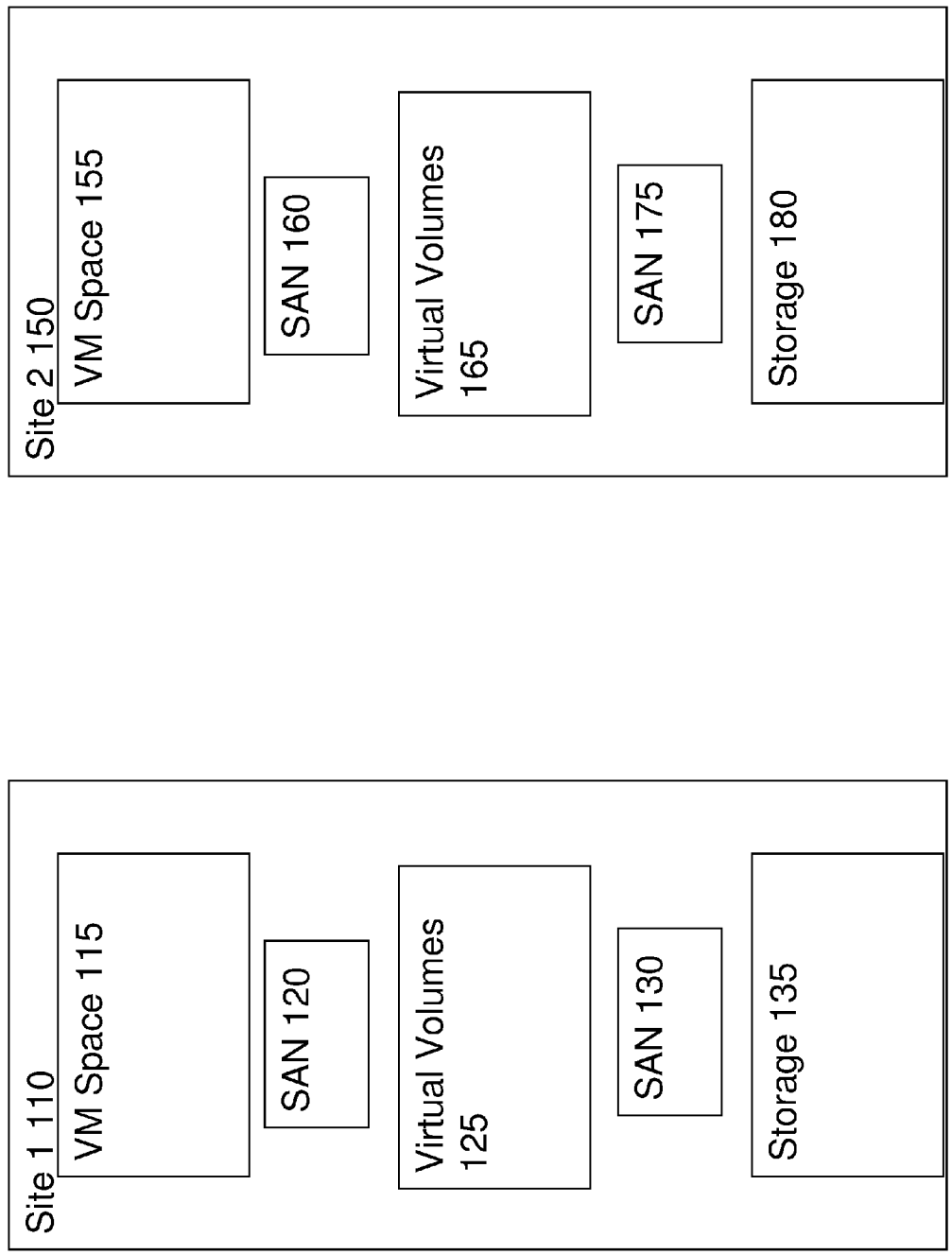
FIG. 1 is an example embodiment of a according to an aspect of the current disclosure.

A method, system and program product for enabling migration of Virtual Machines with concurrent access to data across two geographically disperse sites to enable load balancing across the two geographically disperse sites, by presenting over a network a read writable logical volume at a first site, presenting over a network a read writable logical volume at a second geographically disparate site; wherein the first volume and the second volume are configured to contain the same information, and enabling read write access to the volume at the first site or the volume at the second site for a first virtual machine while keeping the data consistent between the two sites to enable transparent migration of the virtual machine to load balancing across the two sites according to at least one load balancing metric.

DETAILED DESCRIPTION OF EMBODIMENT(S)

Typical server environments have one or more hosts access storage. Conventionally, some of the hosts may be virtual hosts or virtual machines. Generally, each virtual machine or host has a LUN or logical unit corresponding to storage space it may access. Typically, this LUN corresponds to a portion of one or more physical disks mapped to the LUN or logically drive.

Conventional Server virtualization products may have developed the capability to execute migrations of virtual machines, the underlying storage, or both to address load balancing and high availability requirements with certain limitations. Typically, however there are limitations on the maximum physical separation between the various migration components. Typical implementations limit this distance to within a site. Current approaches do not usually allow site to site separation of shared, coherent resources. Moreover, conventional solutions usually require disruptive failover (i.e. failure of one site to transfer the processes to the back-up site), merged SANs, and do not work with heterogeneous products.

Thus, in typical systems, if the Virtual Machine were migrated to another environment, such as a server at another location outside of a site, the virtual machine would no longer have read write access to the LUN. However, it is desirable to be able to migrate a virtual machine and have it still be able to have read write access to the underlying storage.

Conventionally, companies are increasingly realizing the great business and technical benefits of virtualizing their servers and applications. In some embodiments of the current disclosure, storage systems may also be virtualized. In other embodiments of the current disclosure, server virtualization may enable hardware resources to be pooled into resource groups and dynamically allocated for application workloads. In further embodiments, this may provide a flexible and fluid infrastructure. In certain embodiments, this may allow storage resources to be aggregated and virtualized to provide a dynamic storage infrastructure to complement the dynamic virtual server infrastructure. In further embodiments of the current disclosure a virtual storage solution may be enabled, which builds on fully automated storage tiering to address the need for mobility and flexibility in the underlying storage infrastructure. In further embodiments, this may be addressed is through federation-delivering cooperating pools of storage resources.

In certain embodiments, the federation may enable IT to quickly and efficiently support the business through pools of resources that can be dynamically allocated. In further embodiments, this flexibility may elevate the value IT offers within the business, as application and data movement is possible for better support of services. In some embodiments, cooperating pools of server applications and storage may enable a new model of computing—IT as a service.

In alternative embodiments, to proactively avoid potential disaster threats such as forecasted weather events, IT departments must overcome the challenges that storage virtualization introduces with distance. Typically, it has not been possible to accomplish this without relying on array replication between the data center locations and a site failover process.

In an embodiment of the current invention, users are enabled to access a single copy of data at different geographical locations concurrently, enabling a transparent migration of running virtual machines between data centers. In some embodiments, this capability may enable for transparent load sharing between multiple sites while providing the flexibility of migrating workloads between sites in anticipation of planned events. In other embodiments, in case of an unplanned event that causes disruption of services at one of the data centers, the failed services maybe restarted at the surviving site with minimal effort while minimizing recovery time objective (RTO).

In some embodiments of the current techniques the IT infrastructure including servers, storage, and networks may be virtualized. In certain embodiments, resources may be presented as a uniform set of elements in the virtual environment. In other embodiments of the current techniques local and distributed federation is enabled which may allow transparent cooperation of physical data elements within a single site or two geographically separated sites. In some embodiments, the federation capabilities may enable collection of the heterogeneous data storage solutions at a physical site and present the storage as a pool of resources. In some embodiments, virtual storage is enabled to span multiple data centers In an embodiment of the current techniques, a distributed federation is enabled to allow transparent cooperation of virtualized data elements between two geographically separated sites. In some embodiments of the current techniques, a single copy of data can be shared, accessed and relocated over synchronous distances. In some embodiments, the single copy of the data may be maintained by a mirror. In some embodiments, the copy of the data may be maintained without a mirror through other consistency techniques. In other embodiments, this concurrent access and data mobility are non-disruptive to the user. A discussion of mirroring may be found in U.S. Pat. No. 7,346,805, entitled "PROTECTION OF MIRRORED DATA" issued on Mar. 18, 2008 to EMC Corp, which is hereby incorporated by reference.

In some embodiments of the current techniques, the storage volumes, in a virtualized server environment, which comprise the encapsulation of a virtual machine may be coherently co-located in two sites, enabling simultaneous, local access by the virtual machine regardless of whether the virtual machine is located on the local or remote site. In other embodiments, cooperative clustering of the virtualization server nodes may allow for active/active, concurrent read/write access to one or more federated storage devices across the sites. In further embodiments, concurrent access may occur even if the data has not yet been fully copied between the two sites. In at least some embodiments of the current techniques, it is enabled to reference the source copy in this case, preserving seamless, continuous operation.

In certain embodiments of the current techniques, movement of the virtual machines between the two sites is facilitated. In some embodiments, LUN level access is active/active, any single virtual machine may execute on only one node of the cluster. In further embodiments, enabling of migration of virtual machine instances may enable the migration of the I/O load (specifically read workloads) to storage devices located in the site where the active node resides for any given virtual machine.

A discussion of some types of virtual storage may be found in U.S. Pat. No. 7,206,863, entitled "SYSTEM AND METHOD FOR MANAGING STORAGE NETWORKS AND PROVIDING VIRTUALIZATION OF RESOURCES IN SUCH A NETWORK" issued on Apr. 17, 2007, to EMC Corp, U.S. Pat. No. 7,770,059, entitled "FAILURE PROTECTION IN AN ENVIRONMENT INCLUDING VIRTUALIZATION OF NETWORKED STORAGE RESOURCES" issued on Aug. 3, 2010, to EMC Corp, U.S. Pat. No. 7,739,448, entitled "SYSTEM AND METHOD FOR MANAGING STORAGE NETWORKS AND PROVIDING VIRTUALIZATION OF RESOURCES IN SUCH A NETWORK" issued on Jun. 15, 2010, to EMC Corp, U.S. Pat. No. 7,739,448, entitled "SYSTEM AND METHOD FOR MANAGING STORAGE NETWORKS AND PROVIDING VIRTUALIZATION OF RESOURCES IN SUCH A NETWORK USING ONE OR MORE ASICS" issued on Nov. 17, 2009, to EMC Corp, U.S. Pat. No. 7,620,774, entitled "SYSTEM AND METHOD FOR MANAGING STORAGE NETWORKS AND PROVIDING VIRTUALIZATION OF RESOURCES IN SUCH A NETWORK USING ONE OR MORE CONTROL PATH CONTROLLERS WITH AN EMBEDDED ASIC ON EACH CONTROLLER" issued on Nov. 17, 2009, to EMC Corp, U.S. Pat. No. 7,225,317, entitled "SYSTEM AND METHOD FOR MANAGING STORAGE NETWORKS AND FOR MANAGING SCALABILITY OF VOLUMES IN SUCH A NETWORK" issued on May 29, 2007, to EMC Corp, U.S. Pat. No. 7,315,914, entitled "SYSTEMS AND METHODS FOR MANAGING VIRTUALIZED LOGICAL UNITS USING VENDOR SPECIFIC STORAGE ARRAY COMMANDS" issued on Jan. 1, 2008, to EMC Corp, and U.S. Pat. No. 7,216,264, entitled "SYSTEM AND METHOD FOR MANAGING STORAGE NETWORKS AND FOR HANDLING ERRORS IN SUCH A NETWORK" issued on May 8, 2007, to EMC Corp, all of which are hereby incorporated by reference.

In some embodiments of the current techniques, the ability to migrate a VM may be enabled through the use of a federated virtual volume. In certain embodiments, a virtual machine or application may communicate through a network with a module which presents virtual volumes to the application or virtual machine. In some embodiments the network may be a SAN. In at least some embodiments, this module may provide a level of abstraction between the storage and the requests for storage made by a virtual machine or other application. In these embodiments, the module may map the logical drive presented to the VM or application to the storage device. In certain embodiments, the module may be transparent to the storage request, the application or VM functioning as it is accessing a logical drive across a network. In other embodiments the network may be a SAN. In other embodiments, regardless of location of the VM, the VM will attempt to reach the LUN provided by the module, which will map the VM request to the appropriate storage.

In some embodiments of the current invention, a clustering architecture enables servers at multiple data centers to have concurrent read and write access to shared block storage devices. In certain embodiments of the current invention, load sharing between multiple sites while providing the flexibility of migrating workloads between sites in anticipation of planned events such as hardware maintenance is enabled. In further embodiments, in case of an unplanned event that causes disruption of services at one of the data centers, the failed services may be quickly and easily restarted at the surviving site with minimal effort.

In most embodiments, the module may communicate with a second module at the second site to facilitate the federated logical drive. In some embodiments, if a VM were to be moved from the first site to the second site the VM would attempt to access storage through the second module. In most embodiments, the move would be transparent to the VM as it would simply reach out to access the storage and the module on the second site would re-direct the request to the storage on the second site. In some embodiments, the module on the second site would direct the request to the data on the second site. In some embodiments, the storage may be kept in sync using a mirror, the VM will access a current version of the data, regardless of on which site the VM is located. The modules at the first and second site may be in communication with each other.

In some embodiments, disparate storage arrays at two separate locations may be enabled to appear as a single, shared array to application hosts, allowing for the easy migration and planned relocation of application servers and application data, whether physical or virtual. In other embodiments, effective information distribution by sharing and pooling storage resources across multiple hosts may enabled. In further embodiments, manage of virtual environment may be enabled to transparently share and balance resources across physical data centers, ensure instant, realtime data access for remote users, increase protection to reduce unplanned application outages, and transparently share and balance resources within and across physical data centers.

In certain embodiments, the allocation of VMs between geographically disperse site may be managed. In a particular embodiment, VMs may be balanced between sites based on Quality of Service (QoS) metrics. In another embodiment, VMs may be balanced between sites based on process or resource load. In further embodiments, VMs may be balanced between sites based on application priority. In alternative embodiments, VMs may be balanced between sites based on expected or predicted environmental conditions at a site. In other embodiments, VMs may be balanced between sites based on Service Level Agreements.

In certain embodiments, Microsoft, Oracle, and SAP applicants may be enabled to be seamlessly migrated across data centers. In other embodiments, running applications and data may be transparently moved between sites, eliminating service disruption during scheduled downtime events. In other embodiments, storage may be easily added or removed so that the location of the data on a single array becomes much less important. In further embodiments, this may enable seamless, multi-site storage layer that can easily be hosted onsite or shifted to a hosting provider and instant, realtime data access for remote users.

In further embodiments, concurrent read and write access to data by multiple hosts across two locations may be enabled. In other embodiments, realtime data access to remote physical data centers without local storage may be enabled.

In some embodiments, high availability and workload resiliency across sites may be enabled by proactively avoiding potential disaster threats such as forecasted weather events. In further embodiments, continuous data access at each site or cluster may be enabled in the event of a component failure. In further embodiments, IT may be enabled to respond to a potential threat before it becomes a disaster, by proactively by moving workloads nondisruptively from one site to another. In still further embodiments, migration of a VM may occur with no downtime or disruption.

Refer now to the embodiment of FIG. 1. The embodiment of FIG. 1 illustrates a data storage environment at site 110 and a data storage environment at site 150. At each site, 110, 150, there is a VM or application space, 115, 155, virtual volumes, 125, 165, storage 135, 180, and Storage Area Networks, SANs 120, 130, 160, and 175. Note, that in the examples herein, a SAN is provided although any type of network connectivity may be used.

Figure 2:
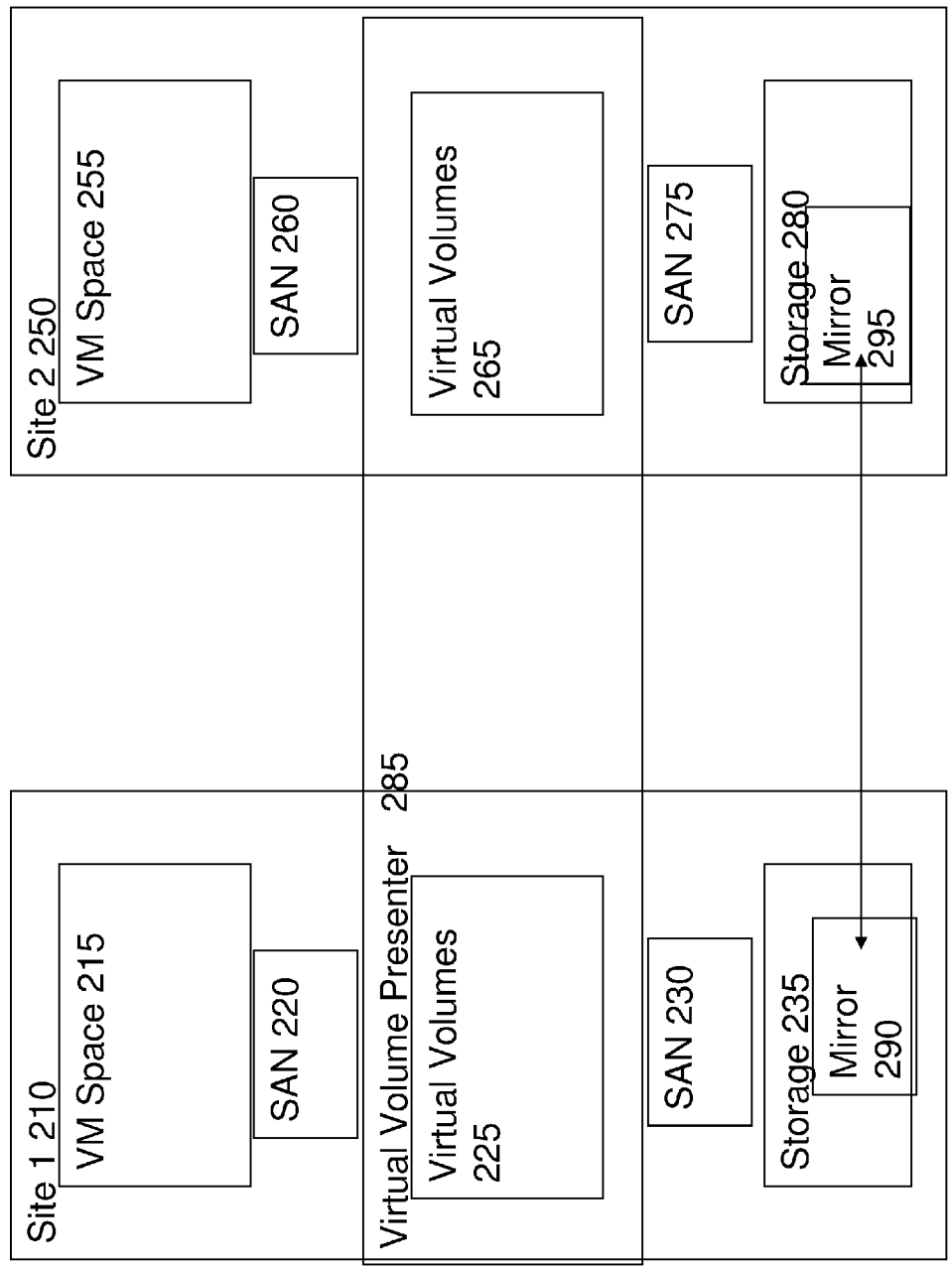
FIG. 2 is an alternative example embodiment of a according to an aspect of the current disclosure.
Figure 3:
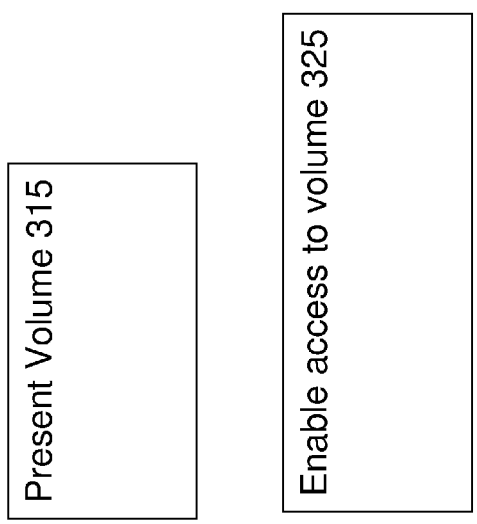
FIG. 3 is an example embodiment of a method according to an aspect of the current disclosure.

Refer now to the embodiments of FIGS. 2 and 3. In this Figure, Virtual Volume Presenter 285 may present volumes to the VM Spaces 210, 150 through the respective SANs 220 (step 315). The Virtual Volume Presenter may be a devices such as the VPLEX provided, for example, by EMC Corporation of Hopkinton, Mass. In alternative embodiments, the Virtual Volume Presenter may be software running on hardware or a processor. In the embodiments of FIGS. 2 and 3, the Virtual Volume Presenter 285 provides a level of abstraction to the a VM running in the VM space. In this embodiment, the VM space may not have any knowledge of the underlying implementation or location of the storage.

Figure 4:
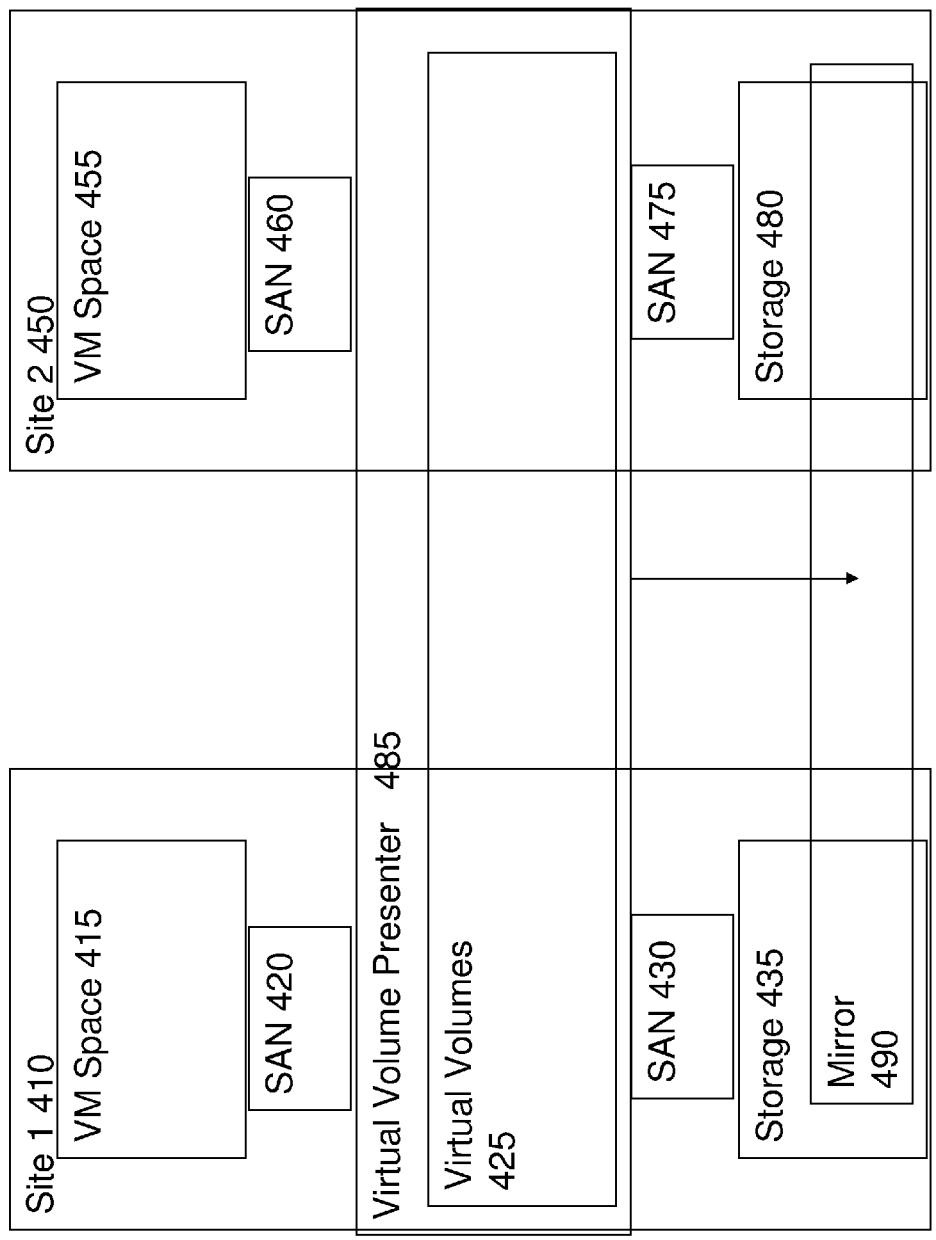
FIG. 4 is an example embodiment of a data storage apparatus according to an aspect of the current disclosure.

Refer now to the embodiment of FIG. 4. In this embodiment, the level of abstraction can be thought of presenting the same Virtual Volumes 425 at both geographically disperse sites 410 and site 450. In this embodiment, this may be accomplished by abstracting the Mirror 490 to exist at storage 435 and 490.

The Virtual Volume presenter enables access to the virtual volumes 255 and 265 (step 325). In this embodiment, Virtual Volumes 225 and 265 are the same consistent volume existing at two different geographically disperse sites, site 210 and site 250. In this embodiment, Virtual Volume presenter is able to provide consistent read write access to the same virtual volume through the use of a mirror. In this embodiment, storage 235 and 280 there are mirrors 290 and 295. Mirrors 290 and 295 mirror the presented Virtual Volumes 225 and 265 to present consistent read write access to the virtual volumes 225 and 265.

Figure 5:
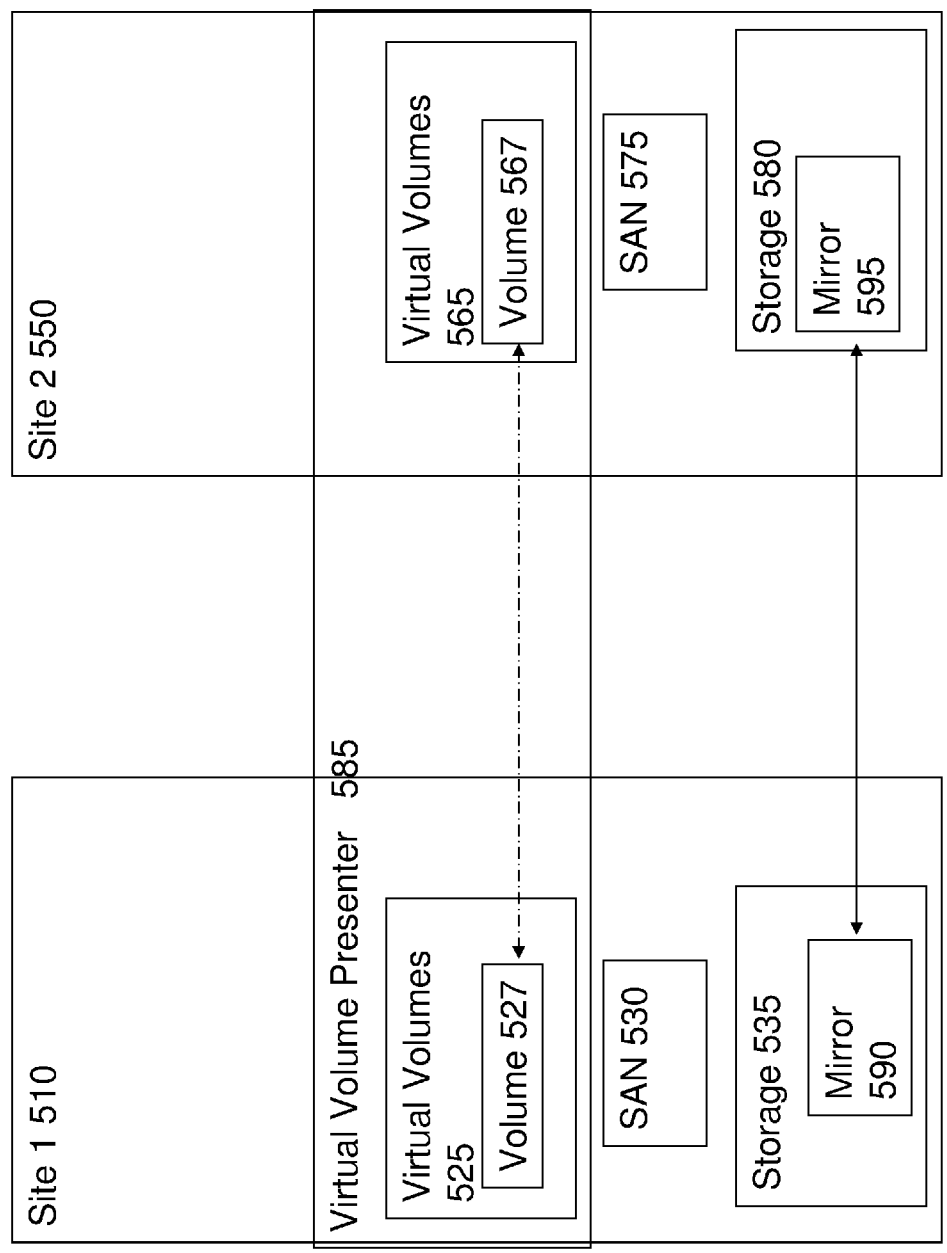
FIG. 5 is an example embodiment of a data storage apparatus with a active or bi-direction mirroring of the data according to an aspect of the current disclosure.
Figure 6:
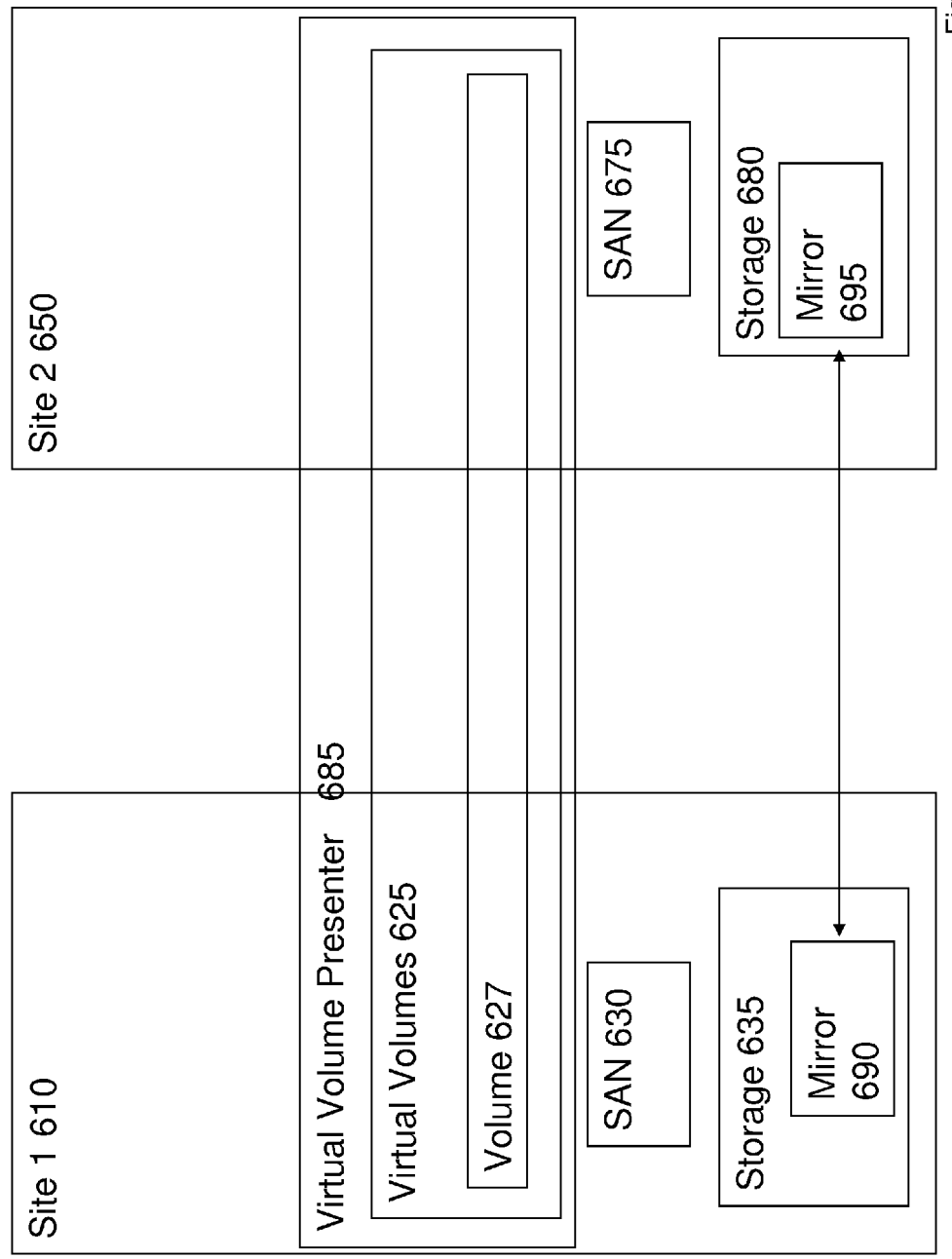
FIG. 6 is an example embodiment of a data storage apparatus with a mirror and a virtual volume according to an aspect of the current disclosure.

Refer now to the embodiment of FIG. 5. In this embodiment, the Virtual Volume Presenter 585 presents Virtual Volumes 527 and 567. In this embodiment, the virtual volumes 527, 567 represent mirrors of the same data. This data is mirrored through mirrors 590 and 595 on storage 580. Referring now to the embodiment of FIG. 6, it would appear to a VM at Site 610 or site 650 that the same volume 627 is being presented by the virtual volume presenter, regardless of at which geographically disperse site the VM is located. In this embodiment, the VM may be transparently presented with the same volume 627 through the use of a mirror.

Figure 7:
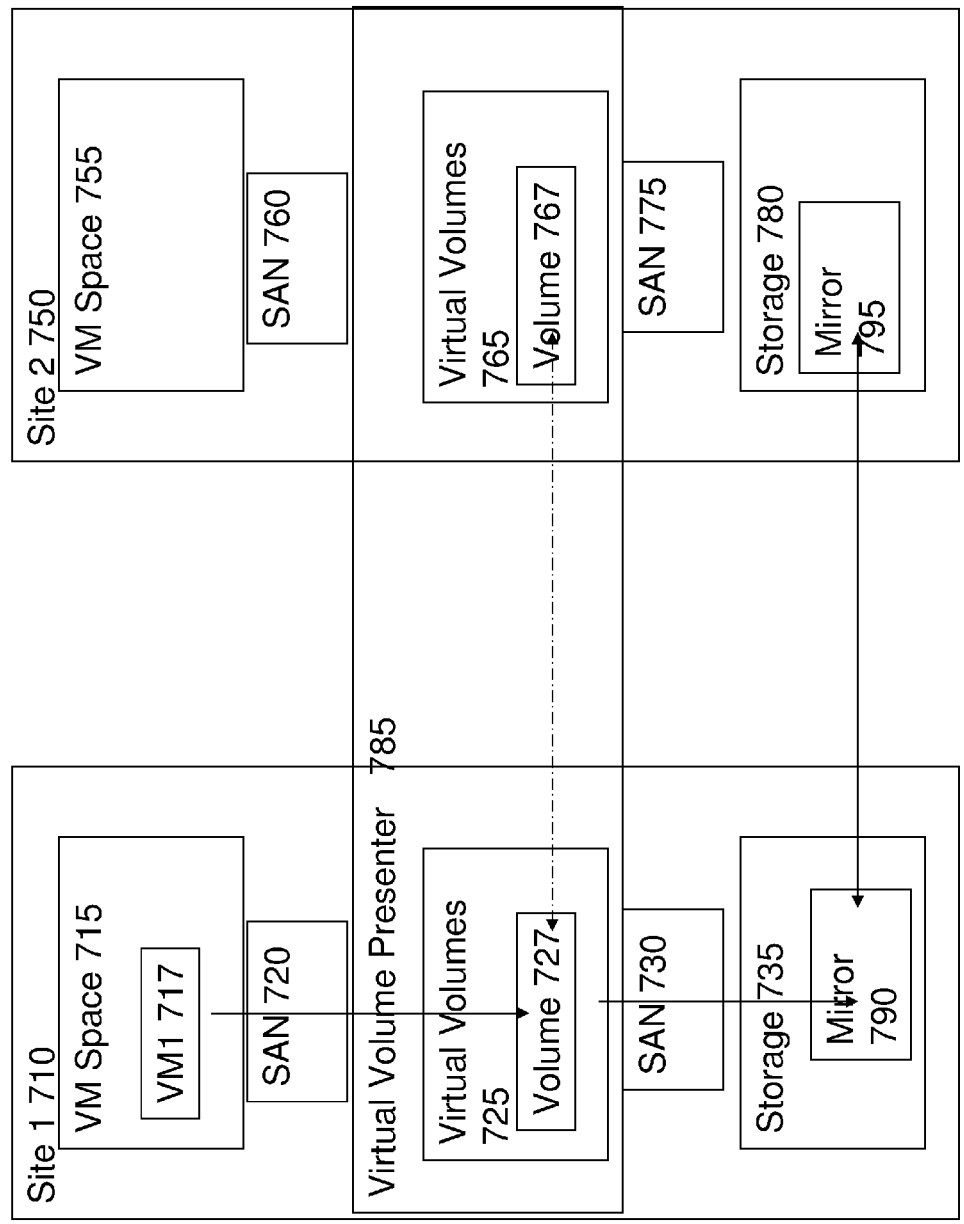
FIG. 7 is an alternative example embodiment of a data storage apparatus with a mirror and a virtual volume according to an aspect of the current disclosure.

Refer now to the embodiment of FIG. 7. In this embodiment, VM 717 is accessing Volume 727 through Virtual Volume Presenter 785 through SAN 720. Virtual Volume Presenter 785 provides access to the data of Volume 727 at storage 735. The volume 727 is mirrored by mirrors 790 and 795.

Figure 8:
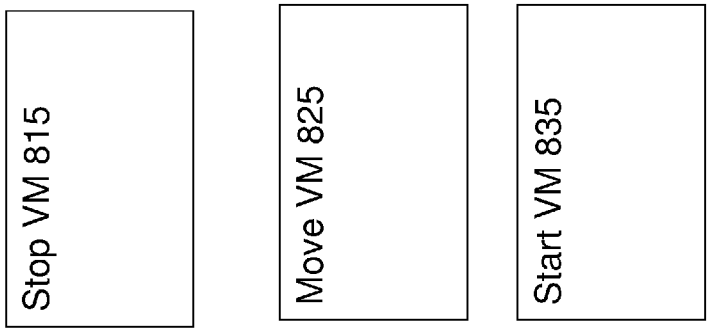
FIG. 8 is an example of an embodiment of a method according to an aspect of an aspect of the current disclosure.
Figure 9:
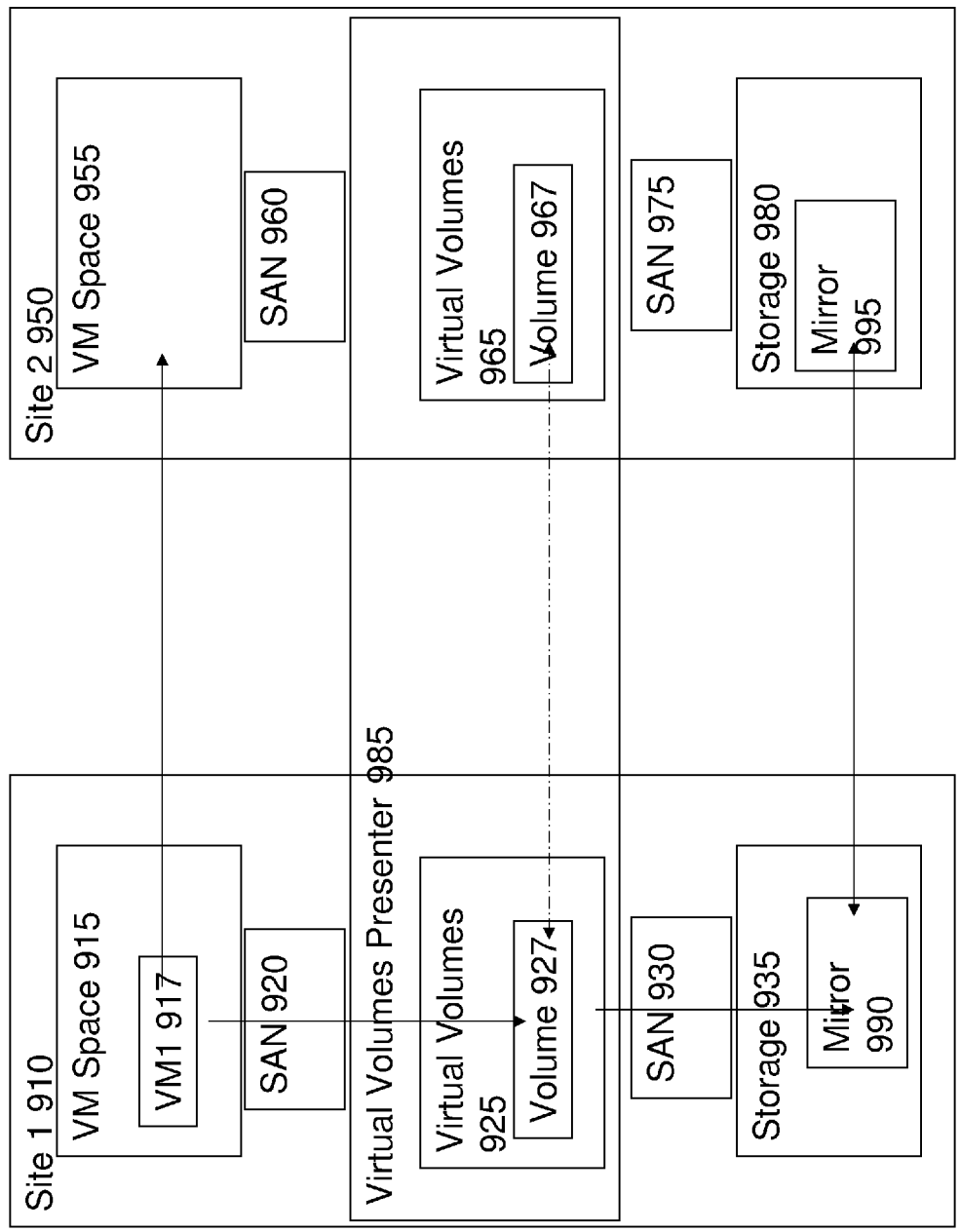
FIG. 9 is an example embodiment of a data storage apparatus with a mirror, virtual volume presenter, and a virtual volume according to an aspect of the current disclosure.
Figure 10:
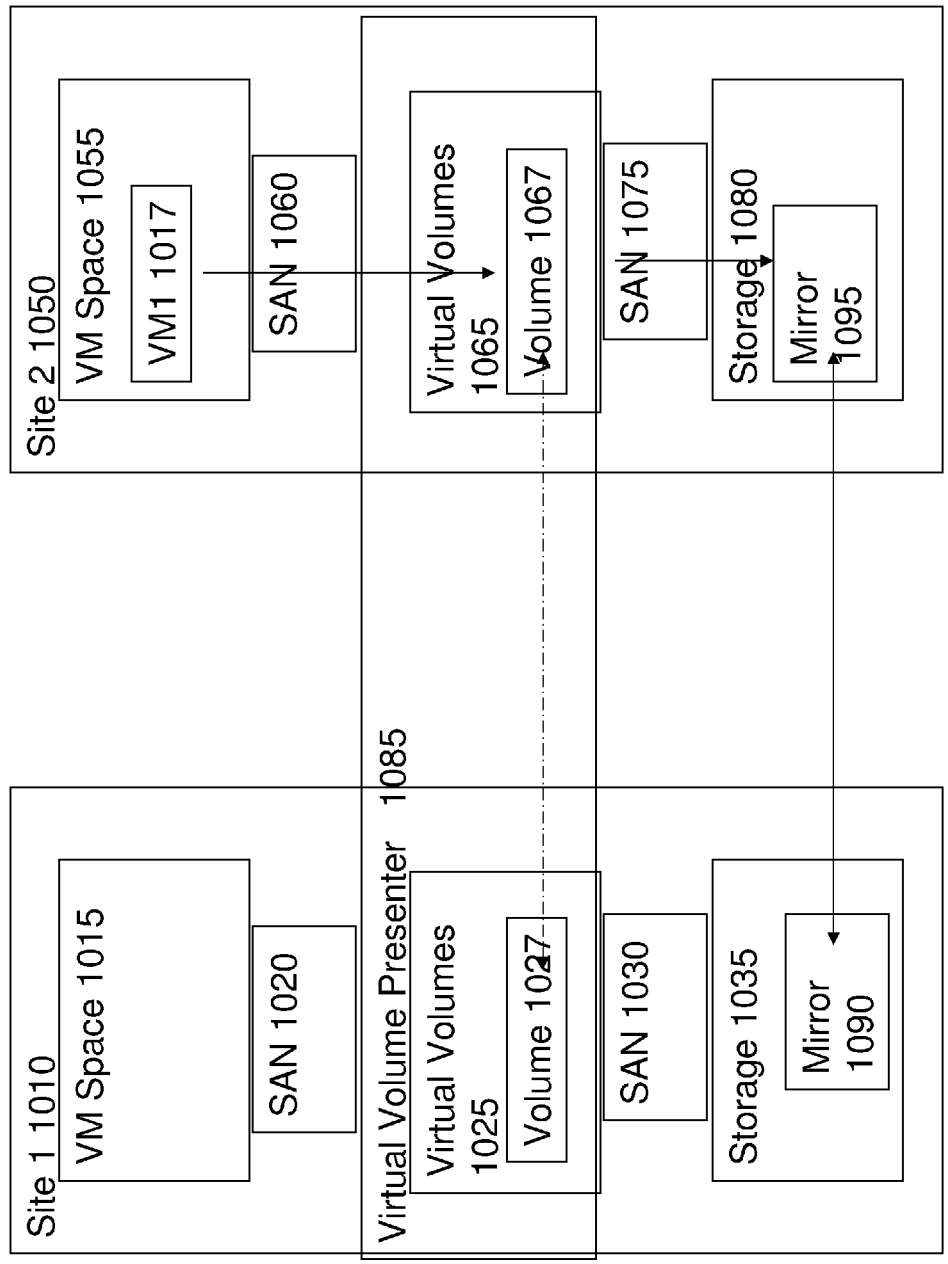
FIG. 10 is an alternative example embodiment of a data storage apparatus with a mirror, virtual volume presenter, and a virtual volume according to an aspect of the current disclosure.

Refer now to the to embodiments of FIGS. 8 and 9. In FIG. 9, it may be desired to move VM 917 from site 910 to a geographically disperse site, such as site 950. In this embodiment, it may be necessary to stop VM 917 (step 915). Refer now to the embodiments of FIGS. 8 and 10. The VM 1017 may be moved (step 925) to site 1050. The VM 1017 may be started (step 935). The VM may access virtual volume 1067 through the virtual volume presenter 1085. The move may be transparent to VM 1017 as the virtual volume 1067 which it is accessing may appear to the VM to be the same as Volume 1027 on Site 1010.

Figure 11:
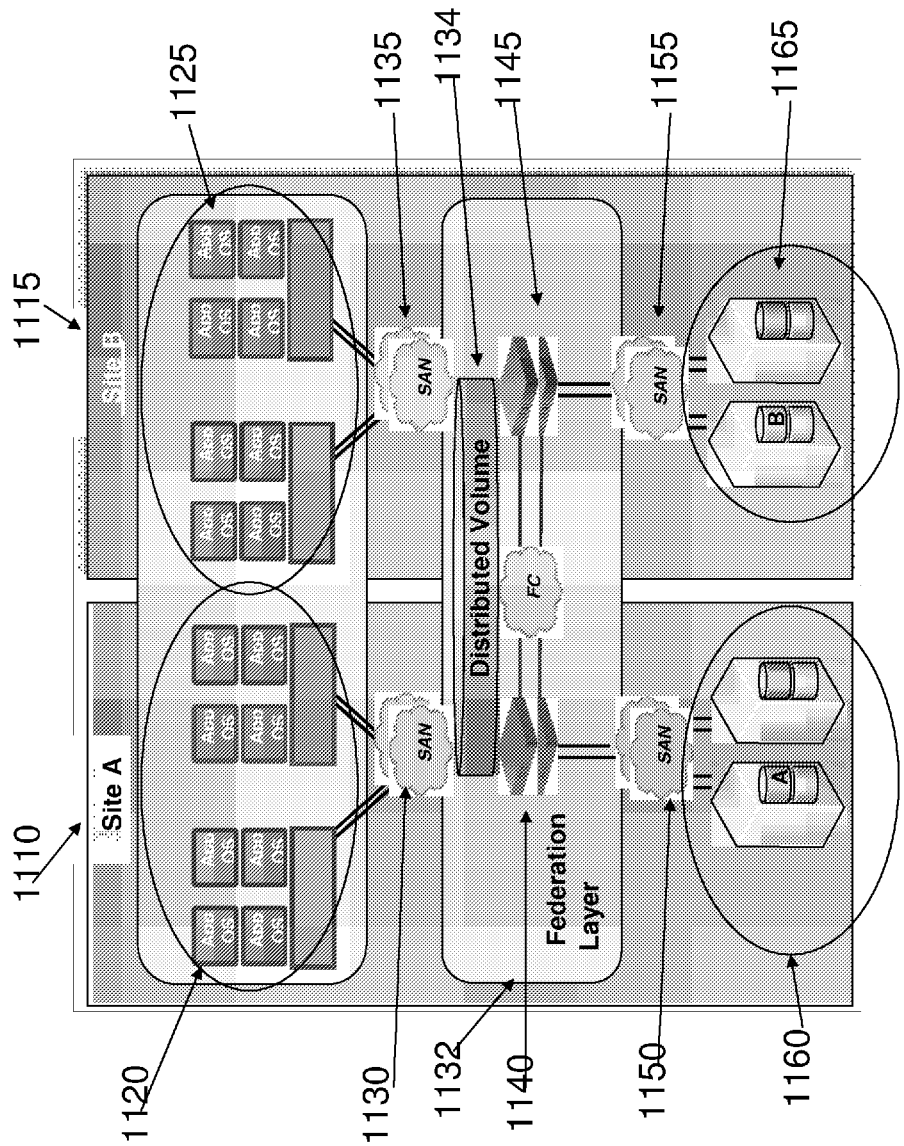
FIG. 11 is a further example embodiment of a data storage apparatus according to an aspect of the current disclosure.

Refer now to the embodiment of FIG. 11. In the embodiment of FIG. 11 there are two sites, 1110 and 1115. Each site has a set of virtual machines and applications 1120, 1125 running at the respective site, 110, 1115. As well, each site, 110, 115 is connected via a SAN 1130 and 1135 to a federated layer 1132 with a distributed volume 1134. In some embodiments, the federation layer may be enabled by a hardware device such as 1140, 1145. In some embodiments, the federated layer may be enabled by software running on hardware. Referring again to FIG. 11, the federated layer 1132 may be connected to storage, 1160, 1165, through a SAN, 1150, 1155. In FIG. 11, the Virtual Machines may access different portions of the federated virtual volume 1134. As well, the Virtual Machines at site 1110 and 1115 may be moved between the sites and retain consistent real time, update information regardless of at which site the Virtual Machine resides.

In the embodiment of FIG. 11, load balancing may be performed with the Virtual Machines. In some embodiments, load balancing may be a technique where heavily utilized resources can migrate some or all of their workload to lesser utilized resources. In other embodiments, load balancing may be used to increase the performance of a particular application, provide more consistent performance across a number of applications, or to increase the availability of an application.

In further embodiments, some criteria that may be used to determine the need to load balance are CPU utilization, I/O utilization, failure of a key resource in the computing network, poor performance of a given application, or a need to perform maintenance on a particular computing resource. In further embodiments, load balancing may be performed to ensure a particular quality of service or service level agreement. In further embodiments, shifting of the VM may be performed based on other environmental variables such as weather instability due to weather phenomenon.

In some embodiments, the current disclosure provides concurrent access and data mobility for data at two geographically disperse sites. In other embodiments, the current disclosure may enable workload balancing and relocation across sites. In further embodiments, the current disclosure enables aggregate data centers and deliver true disaster tolerant, continuous operation. In some embodiments, the current disclosure ensures that all changes are transparently and consistently presented to all hosts, and that they will read only the most recent updates, independent of their source.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Figure 12:
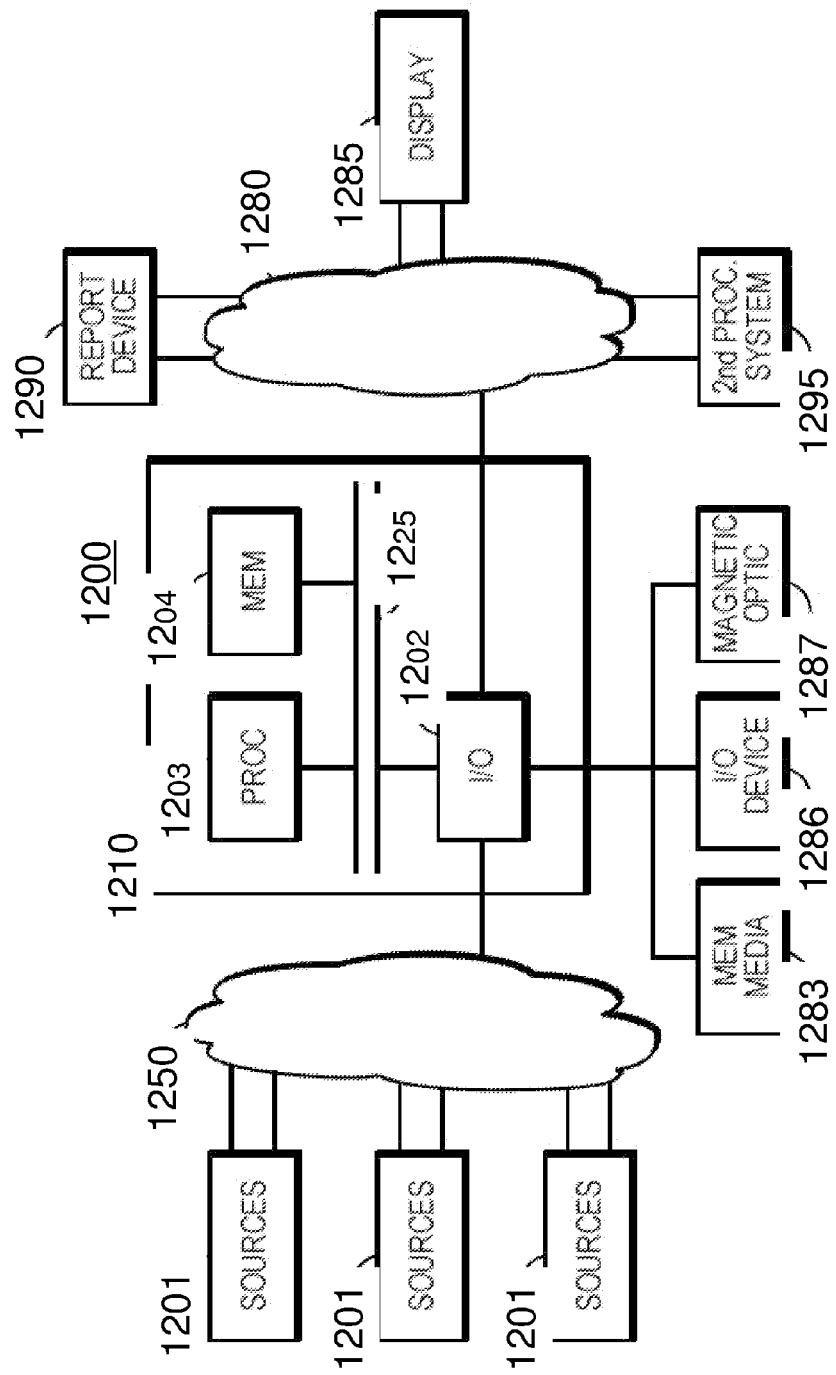
FIG. 12 is an example of an embodiment of an apparatus that may utilize the techniques described herein.
Figure 13:
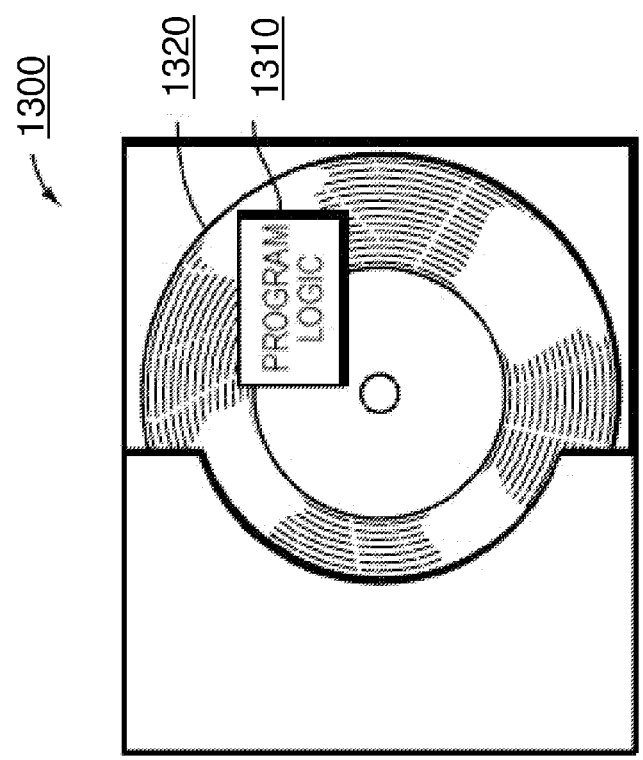
FIG. 13 is an example of an embodiment of a method embodied on a computer readable storage medium that may utilize the techniques described herein.

An embodiment may implement the techniques herein using code executed by a computer processor. For example, the methods and apparatus of this invention may take the form, at least partially, of a computer program product or program code (i.e., instructions) embodied in tangible or non-transient media, such as floppy diskettes, CD-ROMs, hard drives, random access or read only-memory, or any other machine-readable storage medium. When the program code is loaded into and executed by a machine, such as the computer of FIG. 12, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 13 shows Program Logic 1330 embodied on a computer-readable medium 1330 as shown, and wherein the Logic is encoded in computer-executable code configured for carrying out the reservation service process of this invention and thereby forming a Computer Program Product 1300.

The logic for carrying out the method may be embodied as part of the aforementioned system, which is useful for carrying out a method described with reference to embodiments shown in, for example, FIG. 3a. For purposes of illustrating the present invention, the invention is described as embodied in a specific configuration and using special logical arrangements, but one skilled in the art will appreciate that the device is not limited to the specific configuration but rather only by the claims included with this specification. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for enabling migration of Virtual Machines (VMs) with concurrent read and write access to data across two geographically disperse sites to enable load balancing across the two geographically disperse sites, the method comprising:

presenting, using a virtual volume presenter, over a first network a read writable logical volume at a first site, wherein the first site has a first storage medium and a first logical volume;

presenting, using a virtual volume presenter, over a second network the read writable logical volume at a second geographically disparate site, wherein the second site has a second storage medium and a second logical volume; and enabling cotemporaneous read write access from a first virtual machine to the read writable logical volume at the first site and to the read writable logical volume at the second site for a second virtual machine to enable transparent migration of a virtual machine between the first site and the second site to enable load balancing across the first site and the second site according to at least one load balancing metric, wherein the virtual volume presenter provides an abstraction layer spanning between the first site and the second site, wherein transparent migration includes enabling a VM to access the read writeable logical volume as the same logical drive at the first site and the second site; and wherein the read writable logical volume is configured to present logically consistent data at the first site and the second site using the first storage medium and the second storage medium.

2. The method of claim 1 wherein the first logical volume is a mirror of the second logical volume.

3. The method of claim 1 wherein the first storage medium and the second storage medium are asynchronous mirrors.

4. The method of claim 1 wherein the load balancing includes balancing application load across the sites.

5. The method of claim 4 wherein the first and second virtual machines access different portions of the read writable logical volume.

6. The method of claim 1 wherein the first storage medium and the second storage medium are synchronous mirrors.

7. The method of claim 1 wherein when the first virtual machine is migrated from the first site to the second site, enabling the first migrated virtual machine to automatically access the second logical volume rather than the first logical volume.

8. The method of claim 1 wherein the virtual volume presenter is enabled to map a VM request for access to the read writable logical volume to the appropriate storage to enable the virtual machine to make the same request for access to the read write logical volume regardless of whether the VM is at the first site or the second site.

9. The method of claim 1 wherein the VM accesses the read writable logical volume through the virtual volume presenter.

10. A system for enabling migration of Virtual Machines (VMs) with concurrent read and write access to data across two geographically disperse sites to enable load balancing across the two geographically disperse sites, the system comprising:
- a first access module, at a first site, which presents a read writable logical volume accessible over a first network at the first site, wherein the first site has a first storage medium;
- a second access module, at a second site, which presents the read writable logical volume accessible over a second network at a second site, wherein the second site has a second storage medium; and
- computer-executable logic operating in memory, wherein the computer-executable program logic is configured for execution of:
  - enabling cotemporaneous read write access from a first virtual machine to the read writable logical volume at the first site and to the read writable logical volume at the second site for a second virtual machine to enable transparent migration of a virtual machine between the first site and the second site to enable load balancing across the first site and the second site according to at least one load balancing metric, wherein the virtual volume presenter provides an abstraction layer spanning between the first site and the second site, wherein transparent migration includes enabling a VM to access the read writeable logical volume as the same logical drive at the first site and the second site; and wherein the read writable logical volume is configured to present logically consistent data at the first site and the second site using the first storage medium and the second storage medium.

11. The system of claim 10 wherein the first logical volume is a mirror of the second logical volume.

12. The system of claim 10 wherein the first storage medium and the second storage medium are synchronized mirrors.

13. The system of claim 10 wherein the load balancing includes balancing application load across the sites.

14. The system of claim 10 wherein the first and second virtual machines access different portions of the read writable logical volume.

15. The system of claim 12 wherein the first storage medium and the second storage medium are asynchronous mirrors.

16. A computer program product for enabling migration of Virtual Machines (VMs) with concurrent read and write access to data across two geographically disperse sites to enable load balancing across the two geographically disperse sites, the computer program product comprising:
- a non-transitory computer readable medium encoded with computer executable program code, the code configured to enable the execution of:
  - presenting, using a virtual presenter volume, over a first network a read writable logical volume at a first site, wherein the first site has a first storage medium and a first logical volume;
  - presenting, using a virtual presenter volume, over a second network the read writable logical volume at a second geographically disparate site, wherein the second site has a second storage medium and a second logical volume; and
- enabling cotemporaneous read write access from a first virtual machine to the read writable logical volume at the first site and to the read writable logical volume at the second site for a second virtual machine to enable transparent migration of a virtual machine between the first site and the second site to enable load balancing across the first site and the second site according to at least one load balancing metric, wherein the virtual volume presenter provides an abstraction layer spanning between the first site and the second site, wherein transparent migration includes enabling a VM to access the read writeable logical volume as the same logical drive at the first site and the second site; and wherein the read writable logical volume is configured to present logically consistent data at the first site and the second site using the first storage medium and the second storage medium.

17. The program product of claim 16 wherein the first logical volume is a mirror of the second logical volume.

18. The program product of claim 16 wherein the first storage medium and the second storage medium are synchronized mirrors.

19. The program product of claim 16 wherein the load balancing includes balancing application load across the sites.

20. The program product of claim 16 wherein the first and second virtual machines access different portions of the read writable logical volume.

21. The program product of claim 18 wherein the first storage medium and the second storage medium are asynchronous mirrors.

22. The program product of claim 17 wherein when the first virtual machine is migrated from the first site to the second site, enabling the first migrated virtual machine to automatically access the second logical volume rather than the first logical volume.

* * * * *